Figure 1:
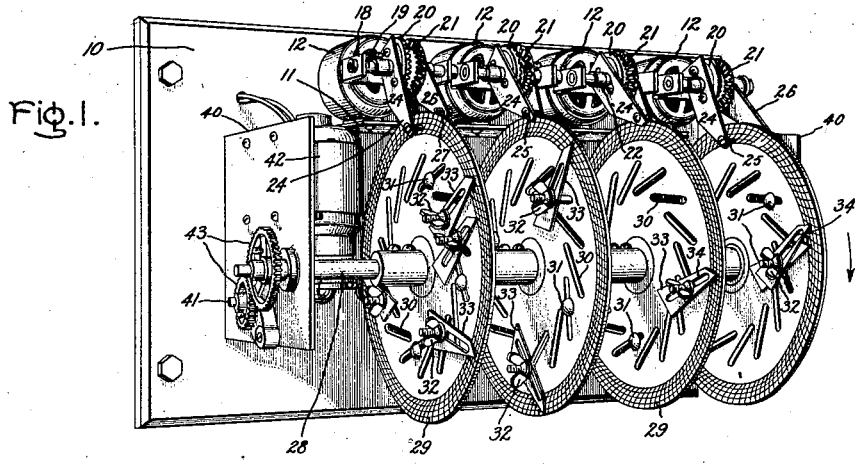

Nov. 30, 1937.  E. D. SCHNEIDER  2,100,876

CONTROL DEVICE

Filed Aug. 27, 1936  2 Sheets-Sheet 1

Inventor:
Elbert D. Schneider,
by Harry E. Dunham
His Attorney.

Nov. 30, 1937.  E. D. SCHNEIDER  2,100,876
CONTROL DEVICE
Filed Aug. 27, 1936  2 Sheets-Sheet 2

Inventor:
Elbert D. Schneider
by Harry E. Dunbar
His Attorney.

Patented Nov. 30, 1937

2,100,876

UNITED STATES PATENT OFFICE 2,100,876

CONTROL DEVICE

Elbert D. Schneider, Scotia, N. Y., assignor to General Electric Company, a corporation of New York Application August 27, 1936, Serial No. 98,199

12 Claims. (Cl. 74—70)

My invention relates to control devices, more particularly to time-cycle control devices for providing timed variations of predetermined character and magnitude in a quantity or condition to be controlled, and my invention has for an object the provision of a simple, reliable, and highly flexible device of this character.

In United States Patent No. 2,016,148 issued October 1, 1935 to H. B. LaRoque and F. R. Elder, there is disclosed a control system in which electric discharge devices are utilized to control the voltage supplied to a plurality of banks of colored electric lights so as to provide an automatic mobile-color lighting system operating to give a predetermined sequence of color variations. In systems of the type disclosed in the above referred to patent, the electric discharge devices which control the lighting circuits are in turn controlled by voltage regulating devices driven either constantly or intermittently at predetermined speeds.

While such systems are entirely satisfactory for many purposes, something is yet to be desired in providing a higher degree of flexibility so as to obtain a large number of preselected color effects and accordingly it is a further object of my invention to provide a time-cycle control device for controlling the character and the duration of the lighting changes, which device is easily adjustable to provide a wide variety of predetermined changes.

In carrying out my invention in one form, I provide a control device having a movable element, a plurality of movable arms connected in driving relationship with the movable element and a rotatable timing disk disposed between the movable arms. Arranged on the opposite faces of the disk I provide a plurality of cam plates for selectively engaging one or the other of the movable arms to operate the movable element of the control devices, and means are provided for adjusting the cam plates angularly and bodily on the disk to vary the rate of movement of the arms, the respective times at which the cams initiate movement of the arms, and the amount of movement of the arms More particularly, the control device comprises a voltage regular the movable element of which is provided with a bevel gear, and a pair of driving gears arranged in meshing engagement therewith respectively support the movable arms. When one arm and its attached gear are moved in a predetermined direction, the voltage output of the regulator is increased and the other arm and its attached gear are moved in an opposite direction. Likewise, when the said other arm is moved in a predetermined direction, the voltage is decreased and the said one arm is moved in the opposite direction. In order to provide for substantially universal adjustment of the cam plates, the disk is provided with a plurality of slots and each cam plate is provided with a similar elongate slot, suitable fastening means extending through the slots for clamping the cam plates in any desired position. Suitable indicia are provided on the opposite faces of the disk to assist in positioning the cams thereon so as to provide predetermined cycles of changes.

Any number of voltage regulating devices may be arranged in side by side relation and the associated timing disks may be driven from a common shaft the speed of which is varied as desired, the particular cycle of changes developed by each voltage regulator depending upon the adjustment of the cams on the associated disk.

Figure 2:
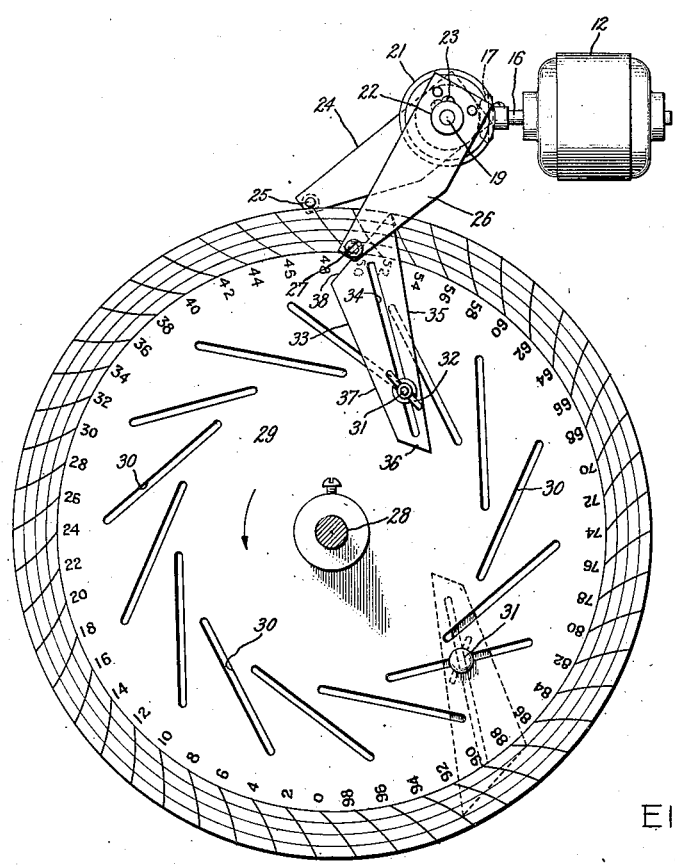
Figure 3:
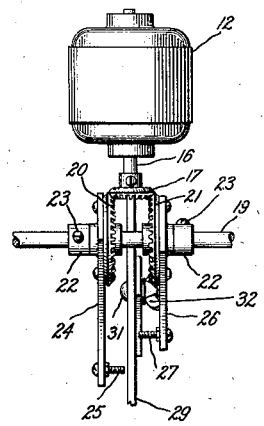
Figure 4:
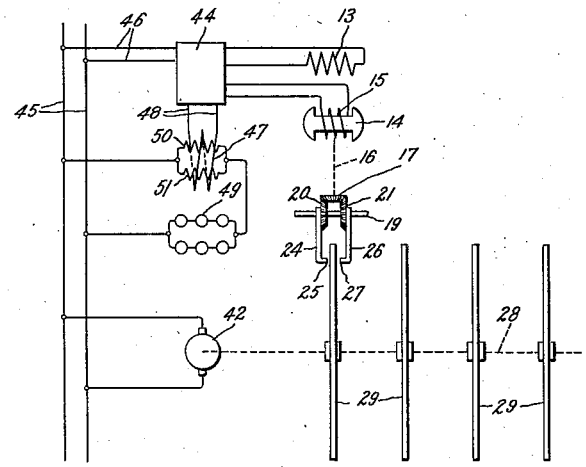
Figure 5:
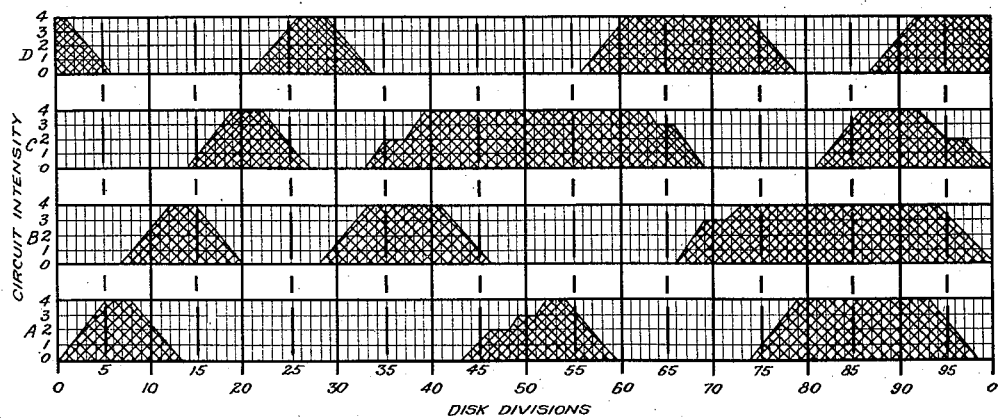

For a more complete understanding of my invention, reference may now be had to the drawings in which Fig. 1 is a perspective view of a control device embodying my invention; Fig. 2 is a fragmentary end view, partly in section, of the control device shown in Fig. 1; Fig. 3 is a plan view of the apparatus shown in Fig. 2; Fig. 4 is a circuit diagram of a control system having my improved control device applied thereto; and Fig. 5 represents graphically a sample time-cycle which may be obtained with my improved control device.

Referring now to the drawings, I have shown my invention as embodied in a control device comprising a base plate 10 from which extends a shelf-like supporting plate 11 on which a plurality of voltage regulating devices 12 are supported. Although these voltage regulating devices 12 may be of any type well known in the art, I have shown for purposes of illustration induction type voltage regulators having a stator winding 13 (Fig. 4) and a movable element or rotor 14 which carries a suitable winding 15.

Inasmuch as each of the regulator devices 12 and its associated mechanism is identical in construction, only one device and its associated mechanism will be described in detail. The movable element or rotor 14 of each of the regulators 12 includes a shaft 16 which carries at its outer end a bevel gear 17, and a U-shaped supporting member 18, which is secured to the frame of the regulator 12, supports a shaft 19 on which are mounted a pair of freely rotatable bevel gears 20 and 21.

As shown best in Fig. 3, these bevel gears 20 and 21 are restrained against longitudinal movement on the shaft 19 by suitable collars 22 which are fixed to the shaft, as for example by set screws 23, and which maintain the gears 20 and 21 in meshing engagement with the bevel gear 17.

Extending outwardly from the bevel gear 20 and secured thereto in any suitable manner, is a movable arm 24 which carries at its outer end an inwardly extending adjustable projection 25, and a similar arm 26 extending outwardly from and secured to the bevel gear 21 carries at its outer end an inwardly extending adjustable projection 27. Mounted below the regulating device 12 on a shaft 28 is a timing disk 29, the outermost portion of which extends between the inwardly extending portions 25 and 27 on the movable arms 24 and 26. As shown, disk 29 is provided with a plurality of elongate slots 30 through which suitable fastening members or bolts 31 extend for cooperation with suitable wing nuts 32 in order to clamp to the opposite faces of the disk 29 a plurality of cam plates 33. Each of these cam plates 33, as shown best in Fig. 2, is provided with an elongate slot 34 through which the bolt 31 extends and with a plurality of oblique cam faces 35, 36, 37, and 38 each of which is angularly disposed relative to the slot 34.

It will be apparent that by means of the bolts 31 and the wing nuts 32 the cam plates 33 may be mounted on the faces of the disk 29 with any desired one of the cam faces 35, 36, 37, or 38 disposed to engage the inwardly projecting portions 25 and 27 of the movable arms 24 and 26 as the disk 29 rotates. For example, in Fig. 1, the cams on the left-hand face of the disk 29 are arranged so that the working faces 35 will engage the inwardly projecting portions 25 as the disks rotate in the direction indicated by the arrow and in Fig. 2 the cams are arranged so that the cam faces 38 will engage the inwardly projecting portion 27 as the disks rotate in the direction indicated by the arrow.

Assuming that the disk 29 is rotated at a constant speed, it will be apparent that the rate at which the arms 24 and 26 are moved by the cams 33 will depend upon the angular position of the selected working face of each cam, the amount which the arm is moved will depend upon the position of the cam 33 relative to the periphery of the disk 29, i. e. the radial distance of the peak of the cam from the periphery of the disk, and the respective time during the rotation of the disk that this movement of the arm will be initiated depends upon the circumferential spacing of the cams on the disk. It will also be apparent that the slots 30 and 34 in cooperation with the clamping means permit substantial universal adjustment of the cams relative to each other and relative to the disk 29.

The arrangement of the arms 24 and 26, the gears 17, 20, and 21, and the regulator 12, is such that when the arm 26 is moved outwardly toward the periphery of the disk 29, the rotor 14 is operated to increase the voltage output of the regulator 12 and at the same time the arm 24 is moved inwardly. Similarly, movement of the arm 24 outwardly decreases the voltage output of the regulator and moves the arm 26 inwardly. As shown, suitable indicia are provided on the opposite faces of the disk 29, which indicia include a plurality of concentric circles. Thus, the innermost circle on the right-hand face of the disk 29 (see Fig. 2) represents the minimum or zero voltage position of the arm 26, and the outer periphery of the disk 29 represents the maximum voltage position of the arm 26, the intermediate circles representing one-fourth, one-half, and three-fourths maximum voltage respectively, reading outwardly. Likewise, the innermost circle on the opposite face on the disk (Fig. 1) represents the maximum voltage position of the arm 24 and the outer periphery of the disk represents the zero position, the intermediate circles representing respectively three-fourths, one-half, and one-quarter maximum voltage, reading outwardly.

As shown, each face of the disk is also provided with a plurality of transverse lines which divide the disk into a predetermined number of equal divisions. In Fig. 2, each transverse line represents two divisions, thereby dividing the disk into 100 equal divisions. The manner in which these indicia may be utilized in positioning the cams 33 on the disk so as to provide a preselected cycle of changes will be more fully explained hereinafter in connection with Fig. 5.

The shaft 28, as shown in Fig. 1, supports a plurality of the disks 29, one of which is associated with each of the regulators 12, and the outer ends of the shaft are rotatably supported in suitable plates 40 which extend outwardly from the base plate 10. Supported in the left-hand one of the plates 40 is a shaft 41 which is driven through suitable reduction gearing (not shown) by an electric motor 42 and which is connected to the shaft 28 by suitable speed changing gears 43. If it is desired to change the speed at which the shaft 28 is driven, it is necessary only to remove the gears 43 and to replace them with a similar pair of gears having a different gear ratio.

In Fig. 4, I have shown the control device somewhat diagrammatically as applied to a control system of the type disclosed in the above referred to patent to LaRoque et al. Since the detailed arrangement and the connections of the electric discharge devices and the associated voltage varying apparatus used in such systems form no part of the present invention, these devices are shown diagrammatically as a control panel 44 which is supplied with alternating current from a source of supply 45 through suitable conductors 46 and which supplies unidirectional current to the saturating winding 47 of a reactance device through the conductors 48.

As will be fully understood upon reference to the above referred to patent, the stator winding 13 of the voltage regulator is connected for energization in circuit with a portion of the apparatus contained in the control panel 44 and the rotor winding 15 of the voltage regulator supplies to the control panel a voltage which varies in accordance with the position of the rotor 14, the unidirectional voltage supplied to the saturating winding of the reactance device 47 being controlled in accordance with the voltage supplied by the rotor winding 15.

The lamp circuit to be controlled comprises a bank of lamps 49 connected in series circuit relation with a suitable reactance device. Preferably, the reactance device comprises two similar windings 50 and 51 connected in parallel in the lamp circuit on a suitable iron core (not shown) and oppositely wound so that their induced voltages exactly counterbalance each other, while surrounding these two windings is the direct current saturating winding 47. This arrangement prevents detrimental inductive action between the winding 47 and the two windings 50 and 51.

It will be understood, of course, that the current in the lamp circuit is controlled by varying the saturation of the core of the reactance device by the current through the winding 47, an increase in current in the winding 47 increasing the saturation and hence increasing the brilliancy of the lamps, and vice versa.

While I have shown only one lamp circuit and the associated control apparatus therefor, it will be understood, of course, that a similar arrangement is provided for cooperation with each of the timing disks 29 and it will be apparent that as the disks 29 are rotated upon energization of the motor 42, the brilliancy of each bank of lamps will be selectively varied in accordance with the positions of the various cams on the disks 29.

In Fig. 5 I have shown a special form of graph paper which may be conveniently used to lay out a desired cycle of changes in the brilliancy of the lamps and which facilitates the location of the various cams on the timing disks 29. As shown, the graph paper is arranged for four separate lamp circuits A, B, C, and D, a sample time-cycle being shown for purposes of illustration. On the graph, the horizontal lines correspond to the concentric circles on the surface of the disk 29 and the vertical lines correspond to the disk divisions provided by the transverse lines on the face of the disks. These transverse lines, as shown best in Fig. 2, follow the arc of movement of the projections 25 and 27 and accordingly any point on each of these lines represents the same instant of time during the revolution of the disk 29.

Referring again to the graph, the lines sloping upwardly to the right represent increases in the lamp brilliancy and accordingly correspond to cams disposed on the right-hand face of the disk 29. Likewise, the lines sloping downwardly to the right represent decreases in lamp brilliancy and correspond to cams placed on the left-hand face of the disk 29. Thus, it will be apparent that the zero line on the graph corresponds to the innermost circle on the right-hand face of the disk and to the outermost periphery on the left-hand face of the disk, the horizontal line on the graph represented by the numeral 4 corresponding to the periphery on the right-hand face of the disk and to the innermost circle on the left-hand face of the disk.

It will now be assumed that it is desired to provide a cycle of light changes similar to the second cycle of changes indicated in the graph of Fig. 5 for the circuit A. As shown, this cycle of changes begins at the 43rd division on the disk, the brilliancy of the lamps being gradually increased to one-half brilliancy at the 46th division, held constant to the 48th division, gradually increased to three-fourths brilliancy at the 49th division, held constant to the 51st division, and gradually increased to maximum brilliancy at the 52nd division. The lamps are then maintained at maximum brilliancy to the 54th division, and the brilliancy is then gradually decreased until the lamps are completely extinguished slightly beyond the 59th division.

In order to provide this cycle of changes, it is necessary only to place one of the cams on the right-hand face of the disk so that its working face crosses the 43rd transverse line at the inner circle, the peak of the cam lying at the intersection of the middle circle and the 46th transverse line. Another cam is then placed on the right-hand face of the disk which crosses the middle circle at the 48th division, the peak of the cam intercepting the three-fourths brilliancy circle at the 49th transverse line, and a third cam is so located that it crosses the three-fourths brilliancy circle at the 51st division with its peak intercepting the outer periphery of the disk at the 52nd transverse line. On the left-hand face of the disk, a single cam is provided which intersects the innermost circle at the 54th division, the peak of the cam lying at the outer periphery of the disk slightly beyond the 59th transverse line.

As the disk 29 rotates, the cams on the right-hand face of the disk sequentially engage the inwardly projecting portion 27 and move the arm 26 outwardly in predetermined steps to increase the voltage output of the regulator 12 and thereby to increase the brilliancy of the lamps in accordance with the above referred to time cycles. When the arm 26 reaches its outermost position, the lamps are at their maximum brilliancy and will remain so until the cam on the left-hand face of the disk engages the inwardly projecting portion 25 so as to move the arm 24 outward and gradually decrease the voltage output of the regulator 12 and the brilliancy of the lamps.

It will be apparent that I have provided a control device which is readily adjustable to provide any number of cyclic changes in a lighting system of the type herein described by means of which an almost infinite variety of color effects may be obtained.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim is new and desire to secure by Letters Patent of the United States:

1. A time-cycle control device comprising control means including a movable element, a pair of movable arms disposed in substantially paralell planes, means forming driving connections between each of said arms and said movable element, a rotatable disk disposed adjacent said arms, a plurality of cams secured to said disk for selectively engaging said arms as said disk rotates, means for rotating said disk, and means for adjusting said cams relative to each other to vary the respective times at which said movement of said arms is initiated by said cams, and relative to said disk to vary the rate of movement of said arms by said cams and the amount of said movement.

2. A time-cycle control device comprising control means including a movable element, a pair of movable arms disposed in substantially parallel planes, means forming driving connections between each of said arms and said movable element, a rotatable disk disposed between said movable arms, a plurality of cams secured to the opposite sides of said disk for selectively engaging said arms as said disk rotates, means for rotating said disk, and means for adjusting said cams relative to each other to vary the respective times at which said movement of said arms is initiated by said cams, and relative to said disk to vary the rate of movement of said arms by said cams and the amount of said movement.

3. A time-cycle control device comprising control means including a movable element, a pair of movable arms disposed in substantially parallel planes, means forming driving connections between each of said arms and said movable element, a rotatable disk disposed between said arms and having a plurality of circumferentially disposed slots therein, a plurality of cam plates, means including fastening members extending through said slots for clamping said cam plates to the opposite faces of said disk, and means for rotating said disk at a predetermined speed selectively to engage said cams with said arms, said clamping means and said slots providing for angular adjustment of said cams to vary the rate of movement of said arms by said cams and bodily adjustment of said cam plates to vary the respective times at which movement of said cams is initiated by said cams.

4. A time-cycle control device comprising control means including a movable element, a pair of movable arms disposed in substantially parallel planes, means forming driving connections between each of said arms and said movable element, a rotatable disk disposed adjacent the free ends of said arms having a plurality of circumferentially disposed slots therein, a plurality of cam plates each of which is provided with an elongate slot and an elongated cam face, means including fastening members extending through said slots in said disk and said cam plates for clamping said cam plates on said disk, and means for rotating said disk at a predetermined speed selectively to engage said cam plates with said arms, said clamping means and said slots providing for angular adjustment of said cam plates to vary the rate of movement of said arms by said cam plates, and bodily adjustment of said cam plates to vary the respective times at which movement of said arms is initiated by said cam plates and the amount of said movement.

5. A time-cycle control device comprising control means including a movable element, a pair of movable arms disposed in substantially parallel planes, means forming driving connections between each of said arms and said movable element, a rotatable disk disposed between the free ends of said arms having a plurality of circumferentially disposed slots therein, a plurality of cam plates each of which is provided with an elongate slot, means including fastening members extending through said slots in said disk and said cam plates for clamping said cam plates to the opposite faces of said disk, and means for rotating said disk at a predetermined speed selectively to engage said cam plates with said arms, said clamping means and said slots providing for angular adjustment of said cam plates to vary the rate of movement of said arms by said cams, and bodily adjustment of said cam plates to vary the respective times at which movement of said arms is initiated by said cams and to adjust the amount of said movement.

6. A time-cycle control device comprising control means including a movable element, a pair of movable arms disposed in substantially parallel planes, means forming driving connections between each of said arms and said movable element whereby movement of one of said arms in one direction moves said element and effects movement of said other arm in an opposite direction and movement of said other arm in said one direction reversely moves said element and effects movement of said one arm in said opposite direction, a rotatable disk disposed between said movable arms, and a plurality of cams secured to the opposite faces of said disk for selectively moving one or the other of said arms in said one direction as said disk rotates, means for rotating said disk at a predetermined speed, and means for adjusting said cams relative to each other and to said disk.

7. A time-cycle control device comprising control means including a movable element, a pair of movable arms disposed in substantially parallel planes, means forming driving connections between each of said arms and said movable element whereby movement of one of said arms in one direction moves said element and effects movement of said other arm in an opposite direction and movement of said other arm in said one direction reversely moves said element and effects movement of said one arm in said opposite direction, a rotatable disk disposed between the free ends of said movable arms and having a plurality of circumferentially spaced slots therein, a plurality of cam plates each of which includes a plurality of oblique cam faces and an elongate slot, means including fastening members extending through said slots in said disk and said cam plates for clamping said cam plates to the opposite faces of said disk, and means for rotating said disk at a predetermined speed selectively to engage said cam plates with said arms and thereby move one or the other of said arms in said one direction in predetermined sequence, said slots and said fastening members cooperating to provide for angular and bodily adjustment of said cam plates on said disk to adjust the rate of movement of said arms by said cam plates, the respective times at which said movement is initiated by said cam plates, and the amount of said movement.

8. A time-cycle control device comprising control means having a movable element, a bevel gear for rotating said element, a pair of driving gears engaging said bevel gear in driving relationship whereby rotation of one of said driving gears in one direction drives said bevel gear and effects rotation of the other driving gear in an opposite direction, and rotation of said other driving gear in said one direction reversely drives said bevel gear and effects rotation of said one gear in said opposite direction, a pair of extending arms respectively secured to said pair of driving gears, a rotatable disk disposed between the free ends of said arms, a plurality of cams secured to the opposite faces of said disk for selectively engaging said arms to rotate one or the other of said driving gears in said one direction in predetermined sequence, means for rotating said disk, and means for adjusting said cams to vary the rotation of said gears by said cams.

9. A time-cycle control device comprising a movable element, said control device comprising a pair of movable arms, means forming driving connections between each of said arms and said movable element whereby movement of one arm in one direction operates said element in one direction and effects movement of the other of said arms in an opposite direction, and movement of said other arm in said one direction operates said element in the opposite direction and effects movement of said one arm in said opposite direction, a rotatable disk disposed between said movable arms, a plurality of cams secured to the opposite faces of said disk for selectively engaging said arms, means for rotating said disk at a predetermined speed, and means for adjusting said cams relative to each other and to said disk to vary the rate of movement of said arms, the respective times at which said movement is initiated, and the amount of said movement.

10. A time-cycle control device comprising control means including a movable element, a pair of movable arms, means forming a driving connection between said arms and said movable element, a rotatable disk disposed adjacent said arms, a plurality of cams secured to said disk for selectively engaging said arms to move said arms toward the periphery of said disk, outward movement of one arm effecting movement of said element in one direction and inward movement of the other arm and outward movement of said other arm effecting movement of said element in the opposite direction and inward movement of said first arm, adjustable means for securing said cams to said disk in selected positions, and indicia on said disk for facilitating the positioning of said cams to provide a desired cycle of voltage changes, said indicia including a plurality of concentric circles representing different amounts of movement of said element and a plurality of transverse markings representing time intervals, whereby the slope of said cams relative to said indicia determines the rate of movement of said element, the positions of said cams relative to said concentric circles determine the respective amounts of movement of said element, and the positions of said cams relative to said transverse marks determine the respective times of operation of said element.

11. A time-cycle control device comprising control means including a movable element, a pair of movable arms, means forming a driving connection between said arms and said movable element, a rotatable disk disposed between said arms, a plurality of cams secured to the opposite faces of said disk for selectively engaging said arms to move said arms toward the periphery of said disk, outward movement of one arm effecting movement of said element in one direction and inward movement of the other arm and outward movement of said other arm effecting movement of said element in the opposite direction and inward movement of said first arm, adjustable means for securing said cams to said disk in selected positions, and indicia on said disk for facilitating the positioning of said cams to provide a desired cycle of operation of said element, said indicia including a plurality of concentric circles representing different amounts of movement of said element and a plurality of transverse markings representing predetermined time intervals, whereby the slope of said cams relative to said indicia determines the rate of movement of said element, the positions of said cams relative to said concentric circles determine the respective amounts of movement of said element, and the positions of said cams relative to said transverse marks determine the respective times at which said movements of said element are initiated.

12. For use in a time-cycle control device, a cam comprising a flat rectangular plate having an elongate slot extending substantially the length thereof, each edge of said plate constituting a working cam face and extending at an angle to said slot.

ELBERT D. SCHNEIDER.